(12) United States Patent
Codella et al.

(10) Patent No.: US 12,001,942 B2
(45) Date of Patent: Jun. 4, 2024

(54) BIOLOGICAL NEURON TO ELECTRONIC COMPUTER INTERFACE

(71) Applicant: International Business Machines Corporation, Armonk, NY (US)

(72) Inventors: Christopher F. Codella, LaGrangeville, NY (US); James V. Codella, Danbury, CT (US); Noel C. Codella, White Plains, NY (US); Vince S. Siu, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 1301 days.

(21) Appl. No.: 15/851,949

(22) Filed: Dec. 22, 2017

(65) Prior Publication Data
US 2019/0197393 A1    Jun. 27, 2019

(51) Int. Cl.
| | |
|---|---|
| *A61B 5/24* | (2021.01) |
| *A61B 5/31* | (2021.01) |
| *G06F 13/40* | (2006.01) |
| *G06N 3/06* | (2006.01) |
| *G06N 3/063* | (2023.01) |
| *G06N 20/00* | (2019.01) |

(52) U.S. Cl.
CPC ......... *G06N 3/061* (2013.01); *G06F 13/4068* (2013.01); *G06N 3/063* (2013.01); *G06N 20/00* (2019.01)

(58) Field of Classification Search
CPC ........ G06N 3/061; G06N 20/00; G06N 3/063; G06F 13/4068

USPC ....................................................... 706/1–62
See application file for complete search history.

(56) References Cited

U.S. PATENT DOCUMENTS

| | | | |
|---|---|---|---|
| 6,676,675 B2 | 1/2004 | Mallapragada | |
| 2005/0203601 A1* | 9/2005 | Palanker | A61N 1/0543 607/116 |
| 2006/0135862 A1* | 6/2006 | Tootle | A61B 5/291 600/373 |
| 2010/0211172 A1* | 8/2010 | Bellamkonda | A61B 5/24 623/11.11 |
| 2011/0257501 A1* | 10/2011 | Huys | A61N 1/372 600/377 |
| 2015/0254553 A1* | 9/2015 | Arsovski | G06N 3/063 706/25 |
| 2017/0128015 A1* | 5/2017 | Rogers | A61L 31/14 |

OTHER PUBLICATIONS

Liu, et al., "Extracellular regulators of axonal growth in the adult central nervous system" Philos Trans R Soc Lond B Biol Sci., Sep. 29, 2006; 361(1473):pp. 1593-1610.

(Continued)

*Primary Examiner* — Brandon S Cole
(74) *Attorney, Agent, or Firm* — Kristofer Haggerty; Otterstedt & Kammer PLLC

(57) ABSTRACT

An apparatus includes a substrate, an array of channels disposed in the substrate, wherein first ends of the channels are exposed to an outside the apparatus, a material disposed in the channel that promotes growth of neural tissue, a plurality of electrodes disposed at second ends of the channels, wherein each channel is aligned with a respective one of the electrodes, and a chip electrically connected to the electrodes.

15 Claims, 4 Drawing Sheets

(56) References Cited

OTHER PUBLICATIONS

Nathan, et al., "Differential Effects of Apolipoproteins E3 and E4 on Neuronal Growth in Vitro" Science New Series, vol. 264, No. 5160 (May 6, 1994), pp. 850-852.
Evercooren et al., "Nerve Growth Factor, Laminin, and Fibronectin Promote Neurite Growth in Human Fetal Sensory Ganglia Cultures" Journal of Neuroscience Research, vol. 8, issue 2-3: Oct. 2004, pp. 179-193.
Junyu Mai et al. "Axon Initiation and Growth Cone Turning on Bound Protein Gradients." The Journal of Neuroscience, Jun. 10, 2009, 29(23): pp. 7450-7458.
Jerome Pine et al. "A Cultured Neuron Probe," Proceedings of IEEE-EMBS Annual Meeting, Amsterdam, The Netherlands, paper #421, Nov. 1996 pp. 1-3.
Lisa Weiner "Prosthetic arm moves after muscle contraction detected" https://blog.applysci.com/?p=2149. May 11, 2014, pp. 1-2.

* cited by examiner

BIOLOGICAL NEURON TO ELECTRONIC COMPUTER INTERFACE

BACKGROUND

The present disclosure relates generally to implantable medical devices and more particularly to an interface system for connecting biological tissue to an electrical system.

Current prosthetic device technology lacks precise neural interfaces, leading to limited restoration of function. For example, prosthetic arms rely on myoelectric sensors, which sense activity from many neurons, providing limited ability to control limb and preventing sensory information from reaching the brain. Other controllable prosthetic devices rely on surgically attached electrodes, which are much larger than single neurons or axons, connecting the prosthesis to regions where they are capable of direct stimulation. Due to scale of prosthetic devices, recording of single neuron activity, or stimulation of single neurons, is not possible.

BRIEF SUMMARY

According to an embodiment of the present invention, an apparatus includes a substrate, an array of channels disposed in the substrate, wherein first ends of the channels are exposed to an outside the apparatus, a material disposed in the channel that promotes growth of neural tissue, a plurality of electrodes disposed at second ends of the channels, wherein each channel is aligned with a respective one of the electrodes, and a chip electrically connected to the electrodes.

According to an embodiment of the present invention, a method comprises recording, by a chip comprising a neural interface having a plurality of micro-channels, axon action potentials of individual axons among a plurality of axons, wherein the axon potentials are correlated to a physical action performed using a prosthetic device, generating a first mapping of the recorded axon action potentials to the physical action using the prosthetic device; and implementing the first mapping to control the prosthetic device by applying potentials to the individual axons.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

Direct neurological control of a digital electronics system.
Direct neurological feedback from a digital electronics system to biological entity.
Control over a prosthetic limb that closely mimics natural limb function.
Treatment of neurodegenerative conditions.
Dynamic training/adaptation of a neurological control device to physiological changes over time.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an embodiment of the present invention, neurons are coaxed to grow into a physical interface comprising micro-channels. Each micro-channel has a width configured to receive a single axon therein. Each micro-channel allows both sensing and stimulation of a single neuron through one or more connections to a chip (e.g., a micro-controller).

Herein, it should be understood that a neuron includes a cell body or soma, dendrites, and an axon.

Figure 1:
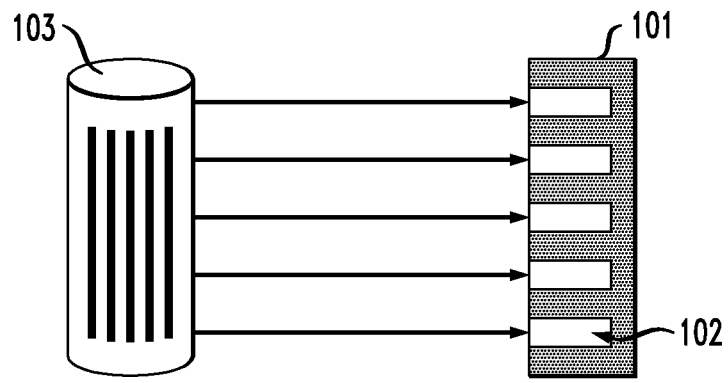
FIG. 1 is an illustration of an interface according to an embodiment of the present invention.

Existing technologies must either physically intrude a cell, surrounding cell space, or be in close physical proximity to the cell, and can only stimulate or sense from large groups of cells. According to an exemplary embodiment of the present invention, a chip 101 comprising micro-channels 102 is implanted nearby neural tissue 103 (see FIG. 1). These micro-channels have a physical topography inducing neurite outgrowth of neurons and are laced with one or more chemical neuronal growth factors. The neuronal growth factors pharmaceutically encourage tissue 103 to grow individual neurites and axons into the micro-channels of the chip 101. Single axons interface directly to single electrodes of the chip 101.

Figure 2:
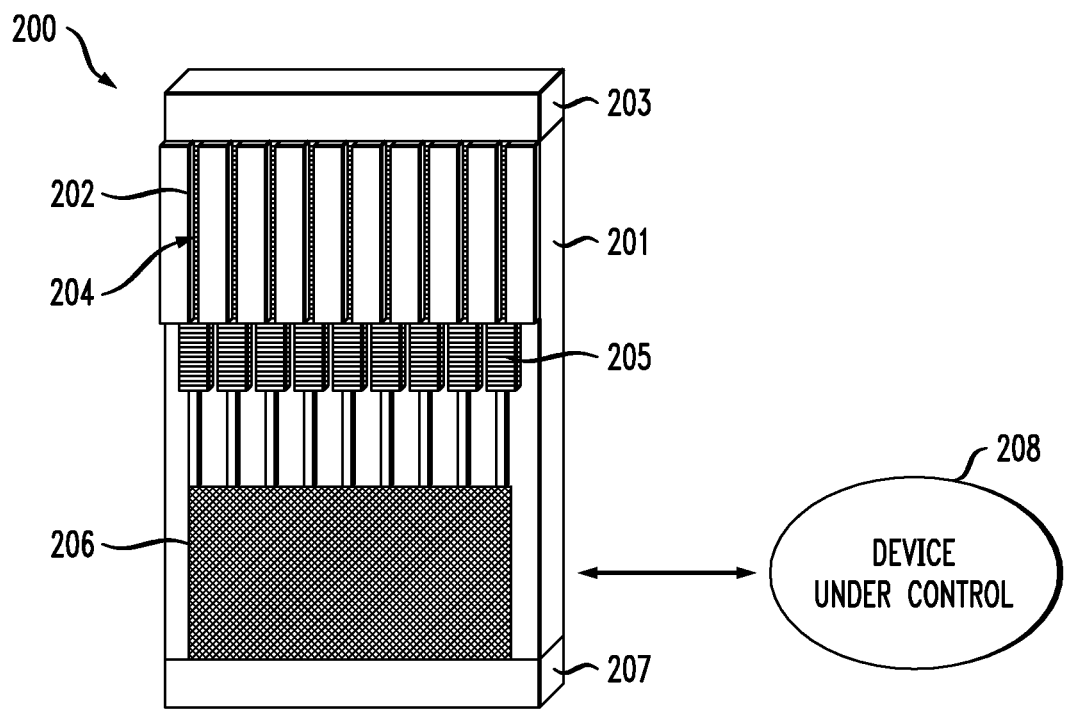
FIG. 2 is a diagram of an interface according to an embodiment of the present invention.

Referring to FIG. 2, according to one or more embodiments of the present invention, chip 200 includes a substrate 201 formed of a quartz substrate, poly-D,L-lactide (PDLA), or other biocompatible flexible materials, such as polyimide or parylene. The chip 200 includes a plurality of micro-channels 202. A first surface of the chip 200 is coated with one or more neuronal growth factors embedded within an extended-release hydrogel 203. Each of the plurality of micro-channels 202 contain one or more neuronal growth factors 204. The chip 200 further includes a plurality of electrodes 205 configured to detect and/or induce axon action potentials, which are discrete electrochemical impulses. One or multiple neural growth factors are integrated with each of the electrodes 205, for example, through methods of electrodeposition or drop-casting onto a surface of the electrodes 205.

It should be understood that a typical action potential for a mammalian cell is +40 millivolt (mV), with a resting potential of −70 mV.

According to an exemplary embodiment of the present invention, the chip 200 includes an integrated chip portion 206 comprising one or more of a data communication device coupled to the electrical electrodes 205 and a processor (e.g., a very-large-scale integration based analog/digital custom processor). According to an embodiment of the present invention, the data communications device of the integrated chip portion 206 communicates with another device 208 via wired or wireless connectivity (e.g., an external computer system or prosthetic device). Examples of wireless communications technologies include Near-Field Communication (NFC), Bluetooth and Radio-frequency identification (RFID). According to at least one exemplary embodiment of the present invention, the processor (e.g., a very-large-scale integration based analog/digital custom processor) of the integrated chip portion 206 is configured to perform local computations. According to an exemplary embodiment of the present invention, the chip 200 includes a power source 207 including, for example, a lithium/iodine battery, lithium/manganese dioxide battery, lithium/carbon monofluoride battery, a glucose fuel cell or the like, powering the integrated chip portion 206 and providing power for firing the electrical electrodes 205. According to at least one embodiment of the present invention, the integrated chip portion 206 is powered by a bio-battery using glucose in bloodstream.

According to an exemplary embodiment of the present invention, the electrodes 205 enable an electric device to sense or induce neural action potential patterns, enabling a connected prosthetic device (to the chip 200) to be controlled by the wearer, or to apply sensation back to the wearer. According to at least one embodiment of the present invention, the electrodes 205 are electrochemical electrodes disposed for sensing and stimulation using induction in sensory nerves.

According to at least one exemplary embodiment of the present invention, a chip, e.g., 200, comprising a micro-channel interface is implemented as a direct brain interface to stimulate sensations and provide a control mechanism for a connected device, e.g., 208. According to at least one embodiment of the present invention, the direct brain interface provides for information transfer, in the form of sensory signals.

Figure 3:
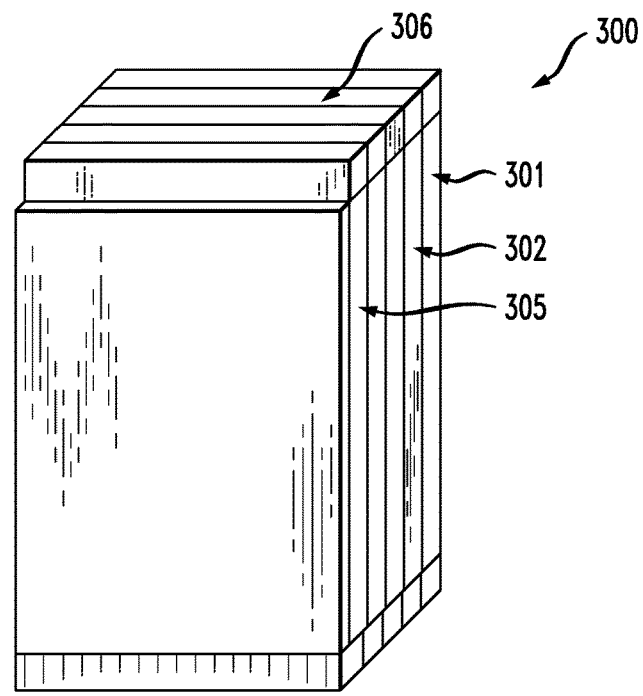
FIG. 3 is a diagram of a stack of chips creating surface interface according to an embodiment of the present invention.

According to at least one embodiment of the present invention, multiple chips 301, 302, . . . 305 are stacked to form an array 300 (see FIG. 3). Each of the chips includes respective micro-channels. The stacked chips 301, 302, . . . 305 are stacked together create a surface 306 for neural interface. According to an exemplary implementation, when the array 300 is disposed near neural tissue, axons or neurons receive chemical signals via diffusion gradients to spawn dendritic/axonal cone growth in a direction of the surface 306, and into the micro-channels.

According to at least one embodiment of the present invention, multiple chips can share one or more integrated chip portions (see e.g., 206, FIG. 2).

Figure 4:
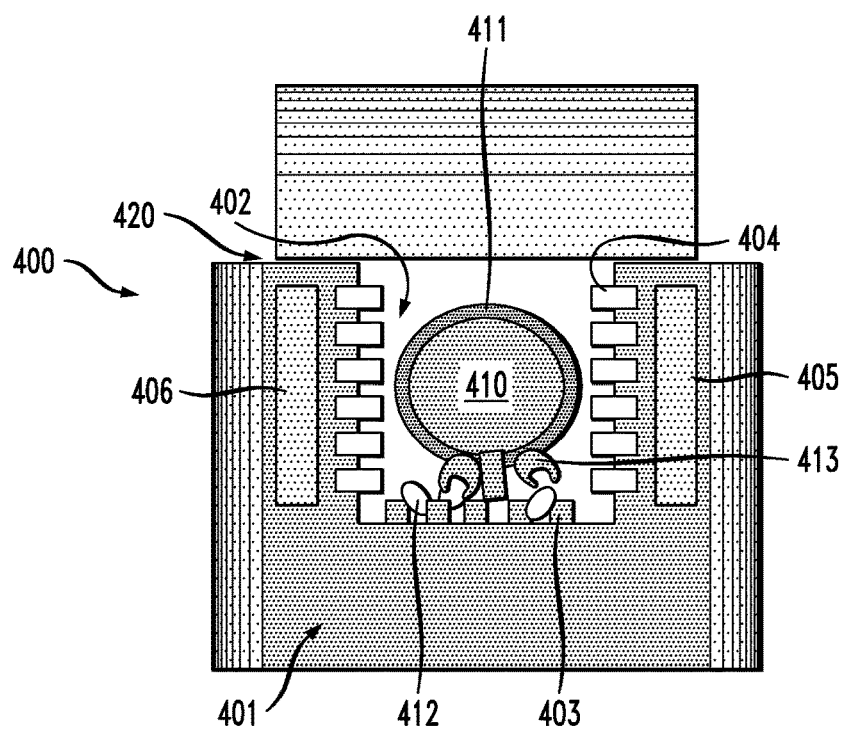
FIG. 4 is an illustration of a microchannel cross-section according to an embodying of the present invention.

Referring to FIG. 4, a micro-channel structure 400 (illustrated in cross-section) comprises a substrate 401. The substrate 401 can be formed of silicon (Si) or silicon dioxide ($SiO_2$) material, or a flexible substrate, such as polyimide or parylene. A micro-channel 402 is formed in the substrate 401 having patterned micro-structures 404 disposed on a wall thereof. A growth factor protein 403 is disposed on walls of the micro-channel. The structure 400 further comprises an induction generator 405 and an induction sensor 406, which can be formed of a metal, on opposite sides of the micro-channel 402. According to an embodiment of the present invention, the induction generator 405 and the induction sensor 406 are combined in a unitary device (not shown). The induction generators and induction sensors provide a functional connection between the electrodes 205 and the neural tissue (i.e., axons).

The micro-channel structure 400 can be formed in a variety of techniques used in semiconductor processing, including a multi-layer patterning processes using sequential lithography, material removal, and deposition steps.

FIG. 4 further illustrates an axon 410 grown into the micro-channel 402 and having a cell membrane 411. The axon 410 includes a growth cone receptor 413 (expressed on the axon) that contacts an extracellular matrix protein/cell adhesion molecules 412 and the growth factor protein 403 disposed in the micro-channel 402. Also shown is an interface 420 between micro-channel structures 400. The interface 420 is a bond between adjacent micro-channel structures. As shown in FIG. 4, an adjacent micro-channel structure can complete an enclosure of the micro channel 402. The bond between micro-channel structures can be formed by, for example, an epoxy.

According to an embodiment of the present invention, and in view of FIG. 4, electrical sensing and stimulation is performed with induction, using the induction sensors. The growth factors 403 and micro-patterned structures 404 encourage axon development into/through the channel 402. Furthermore, the extracellular matrix protein/cell adhesion molecules 412 enable the axon 410 to physically adhere to a wall of the micro-channel 402.

According to at least one embodiment of the present invention, Schwann cells, stem cells, laminin, neurotropic growth factors or the like are disposed in the micro-patterned structures to encourage axon development into the micro-channels. According to one or more embodiments of the present invention, extracellular matrix protein promotes physically adhesion of the axons to the micro-channels. Micro-patterned structures such a microgrooves and slits have been shown to encourage axon development. According to an embodiment of the present invention, the micro-channels include micropatterned structures and are laced with chemical neuronal growth factors to promote neurite/axon growth into the micro-channels.

For human applications, the diameter of individual soma of neurons range between about 30-100 μm, while axon diameters range between about 0.2-20 μm. According to at least one embodiment of the present invention, the micro-channels 102/202 are formed of arrays of individual micro-channels of varying diameters. The different diameters inherently differentiate types of axon (e.g., myelinated vs. unmyelinated) growing into the interface 101/200. According to at least one embodiment of the present invention, micro-channels can be micropatterned with grooves and slits to promote axon initiation and growth. The micro-channels can be formed by any suitable technique, e.g., reactive ion etching (ME), or atomic force microscopy.

According to at least one embodiment of the present invention, the substrate is patterned having grooves having widths of about 10 μm with a spacing of about 10-20 μm between adjacent grooves. The substrate can be patterned using known techniques. For example, a mask can be formed on a substrate and subjected to reactive ion etching (RIE) to form a patterned substrate having micro-channels with a desired width, spacing, and depth. Any suitable pattern can be used in accordance with teachings of the invention. In a preferred embodiment, the micro-channels in the patterned substrate have, for example, a width of 10 μm, depth of 4.3 μm, and spacing of 10 μm.

According to at least one embodiment of the present invention, cell adhesion can be promoted by coating the substrate with a laminin solution (e.g., in about 100-200 μg/mL phosphate-buffered saline (PBS)). According to one or more embodiments of the present invention, adhesion of Schwann cells to the PDLA substrate is promoted by a laminin coating, where the Schwann cells support neurons and insulate the axon.

According to at least one embodiment of the present invention, micro-channels are coated in a gradient with guidance and growth cues (e.g., proteins) to promote and guide axon development. These guidance and growth cues have different classifications including: (1) neurotrophic factors2,3 including netrin, brain-derived neurotrophic factor (BDNF), Nerve Growth Factor (NGF)3, neurotrophin 3 (NT3); (2) cell adhesion molecules4 such as N-CAM, TAG-1, and MAG; (3) extracellular matrix adhesion molecules3,5 such as laminin, fibronectin, tenascin, perlecan, and apoE3; and (4) guidepost cells6 (immature neurons to help guide neuronal axon growth).

Figure 5:
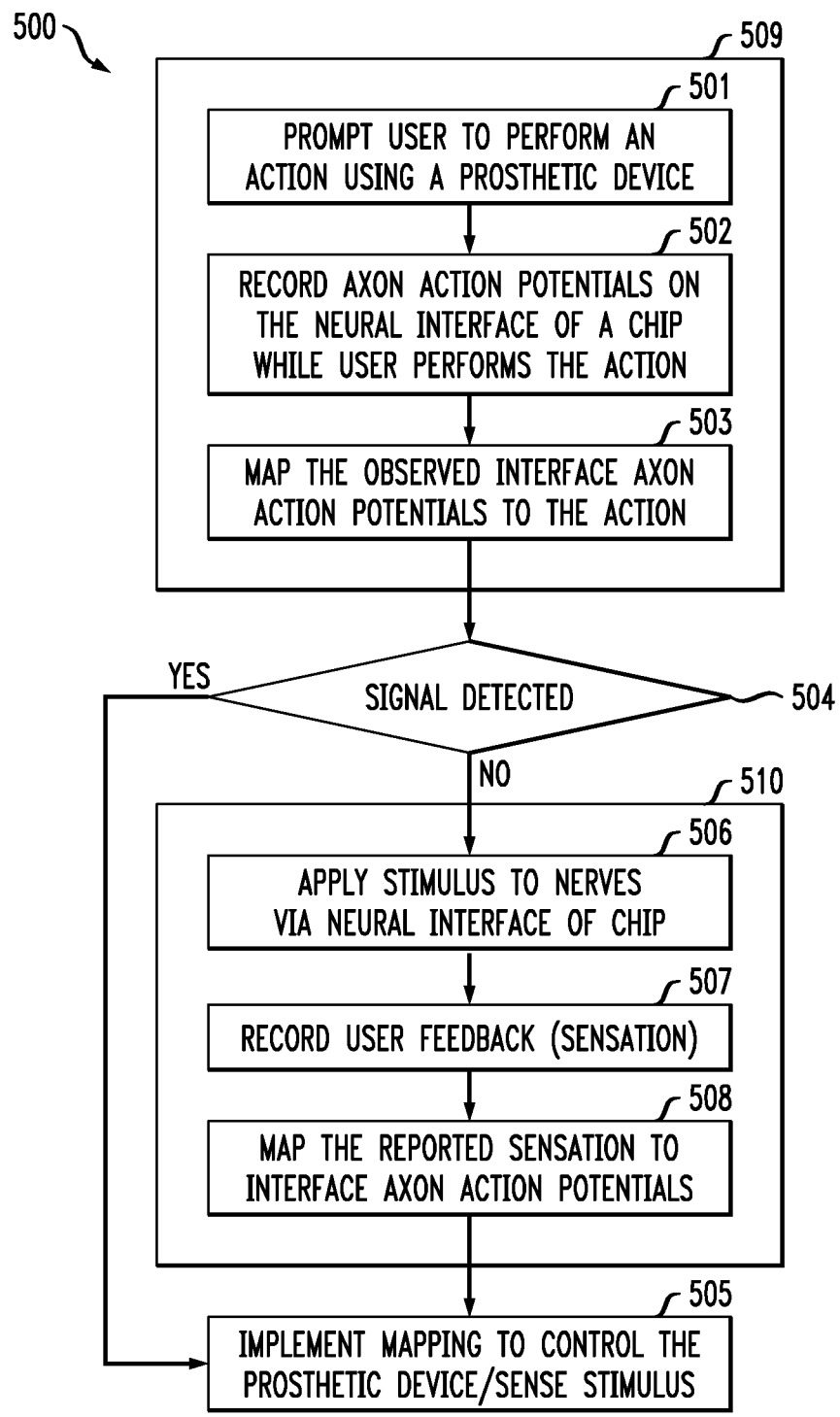
FIG. 5 is a flow diagram of a method for adapting a neurological control device according to an embodiment of the present invention.

According to at least one embodiment of the present invention, a prosthetic training procedure 500 (see FIG. 5) includes long-term human/machine exposure and interaction. The human and the prosthesis acclimate to one another over time. A connection between the human and the prosthesis can be periodically or continually improved through adaptive changes in the chip (see e.g., 200, FIG. 2). According to at least one embodiment of the present invention, the acclimation of the chip is performed by one or more of efferent training, afferent training and population learning.

According to at least one embodiment of the present invention, in an efferent training context, a system, such as an external computer system, prompts a user to perform a variety of physical tasks (501) using a prosthetic device. In this case a chip has been previously disposed at an appropriate location, where axons have grown into a neural interface of the chip. According to an embodiment of the present invention, the user is prompted to perform the task using a visual/audio notification. The notification can come from the prosthetic device or a computer system connected to the prosthetic device. The user performing the task naturally uses efferent nerves (efferent sensory nerves typically function to adjust a sensitivity of a signal relayed by an afferent sensory nerve), and due to the location of the chip, these efferent nerves have attached to the neural interface of the chip. The chip maps observed interface axon action potentials of the axons in the interface 502 to the designated activity using one or more machine learning algorithms (e.g., support vector machine (SVM), neural networks, decision tree, etc.) 503. With each update to the mapping, the user is better able to control the prosthetic device 505.

It should be understood that the efferent training 509 can be implemented as an iterative process, where the method of blocks 501-503 is repeated.

According to at least one embodiment of the present invention, in an afferent training context, varying stimuli are applied to nerves through the chip and its neural interface 506 where no (or an insufficient) signal was detected during efferent training 504. The system prompts the user to designate a type and location of physical sensation 507. The system maps axon action potentials on the neural interface of the chip to the reported sensation 508 using one or more machine learning algorithms (e.g., SVM, neural network, decision tree, etc.). At block 508, a map of signals to sensations is learned so that the device can communicate information, such as pressure heat, or lack of heat, to the nervous system of the user.

It should be understood that the afferent training 510 can be implemented as an iterative process, where the method of blocks 506-508 is repeated.

According to an embodiment of the present invention, the mappings (learned at 503 and 508) can be implemented individually or in combination at block 505.

According to at least one embodiment of the present invention, in a population learning context, the system can potentially utilize transfer learning across individuals to speed the system learning of nerve function. That is, the implementation of the mapping 505 can be performed in a computer system combining mappings learned from one or more users.

Herein, a machine learning method for the efferent and/or afferent calibration is described.

According to at least one embodiment of the present invention, in an efferent calibration (509), the system learns which nerve axon is correlated with which function, both for mechanical control and senses. The system prompts the user to complete a set of nervous system tasks, e.g., to make a fist, curl each finger one at a time from thumb to pinky, move each finger left-right in same order, etc. The system learns nerve axon activity patterns correlated with specific tasks.

According to at least one embodiment of the present invention, in an afferent calibration (510), the system identifies certain axons by those that did not generate action potentials (e.g., potentials sufficient to result in a movement or sensation) during efferent training. Afferent axons are likely physically co-located nearby efferent axons. For example, a signal is transmitted, and the user is asked to localize the signal on a prosthesis or a computer screen. According to at least one embodiment of the present invention, the iterative process (510) generates the mapping as labeled data to understand which axons to excite for certain sensations. According to at least one embodiment of the present invention, reinforcement learning in efferent training is used to interact with the user to determine what sensory axons are used for touch, temperature, pain, and location of each thereof. For example, a stimulus S (e.g., cold, heat, pressure) is applied to the prosthesis, the user's perception of the stimulus, S' is measured (e.g., the user reports the "feeling"), and the system learns how to adjust weights for activation of sensory axons (i.e., a weight on the stimulus) to minimize a distance between the S and S'. That is, the system seeks to align, using a weight on the stimulus, the intended result of the stimulus S with the user's perception of the stimulus S'.

According to at least one embodiment of the present invention, the system is robust and adaptive to physiological changes (e.g., dead or damaged axons, change in cell morphology, etc.). According to one or more embodiments, a maximum-likelihood method or auto-associative neural network is used to estimate missing inputs from historical data.

According to at least one embodiment of the present invention, the calibration method (see FIG. 5) includes injecting noise (e.g., random data) into inputs during training to improve model generalization.

According to at least one embodiment of the present invention, in an exemplary efferent training method a prosthetic limb performs an action (e.g., making a first with a prosthetic hand, bending a knee of a prosthetic leg, etc.). The user is requested to signal nervous impulses that should correspond with the prosthetic's behavior. The procedure is repeated. A chip, connected to the prosthetic limb, captures neural impulse data, and learns models that map the neural impulses to the intended behavior. The process can repeated for different actions.

According to at least one embodiment of the present invention, in at least one exemplary efferent training procedure the user issues nervous impulses to control a prosthetic device to enact an action. While the prosthetic device is under control a force is applied to the prosthetic, e.g., by another device or an assistant, to correct mistakes in the prosthetic's action motion. The chip, communicating with the prosthesis, adapts the model to account for the force-based feedback.

According to at least one embodiment of the present invention, in an afferent training method the prosthesis applies a randomized stimulation to neurons not firing action potentials (neural stimulus) during the efferent training procedure. The user provides feedback for localization and categorizing the stimulus felt (e.g., cold, heat, severity of each, or pain, etc.)

It should be understood that, in addition to the chip and neural interface described herein, the prosthetic device includes components typical of a computer system, including a processor, memory, a storage medium (e.g., hard drive), and a communication interface (e.g., wires local area network (Wi-Fi) interface, Universal Serial Bus (USB), etc.) transferring data and instructions to and from the chip disposed on or in the user. In addition, the prosthetic device includes one or more physical actuators to carry out the action(s). According to an at least one embodiment of the present invention, the prosthetic device includes a display and/or status lights to relay information to the user from the prosthetic device and/or the chip.

According to an at least one embodiment of the present invention, the prosthetic device runs software performing the collection and processing of sensor data from the chip and from any sensors on the device itself (e.g., resistive-based sensors), train the model(s)/perform the mapping of the neural impulses to movements and sensations, and communicate with other devices for data input/output.

Recapitulation:

According to at least one embodiment of the present invention, an apparatus includes a substrate, an array of channels disposed in the substrate, wherein first ends of the channels are exposed to an outside the apparatus, a material disposed in the channel that promotes growth of neural tissue, a plurality of electrodes disposed at second ends of the channels, wherein each channel is aligned with a respective one of the electrodes, and a chip electrically connected to the electrodes.

According to an embodiment of the present invention, a method comprises recording, by a chip comprising a neural interface having a plurality of micro-channels, axon action potentials of individual axons among a plurality of axons, wherein the axon potentials are correlated to a physical action performed using a prosthetic device, generating a first mapping of the recorded axon action potentials to the physical action using the prosthetic device; and implementing the first mapping to control the prosthetic device by applying potentials to the individual axons.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for an interface system for connecting biological tissue to an electrical system. Further, a computer program product can include a tangible computer-readable recordable storage medium with code adapted to be executed to carry out one or more method steps described herein, including the provision of the system with the distinct software modules.

Figure 6:
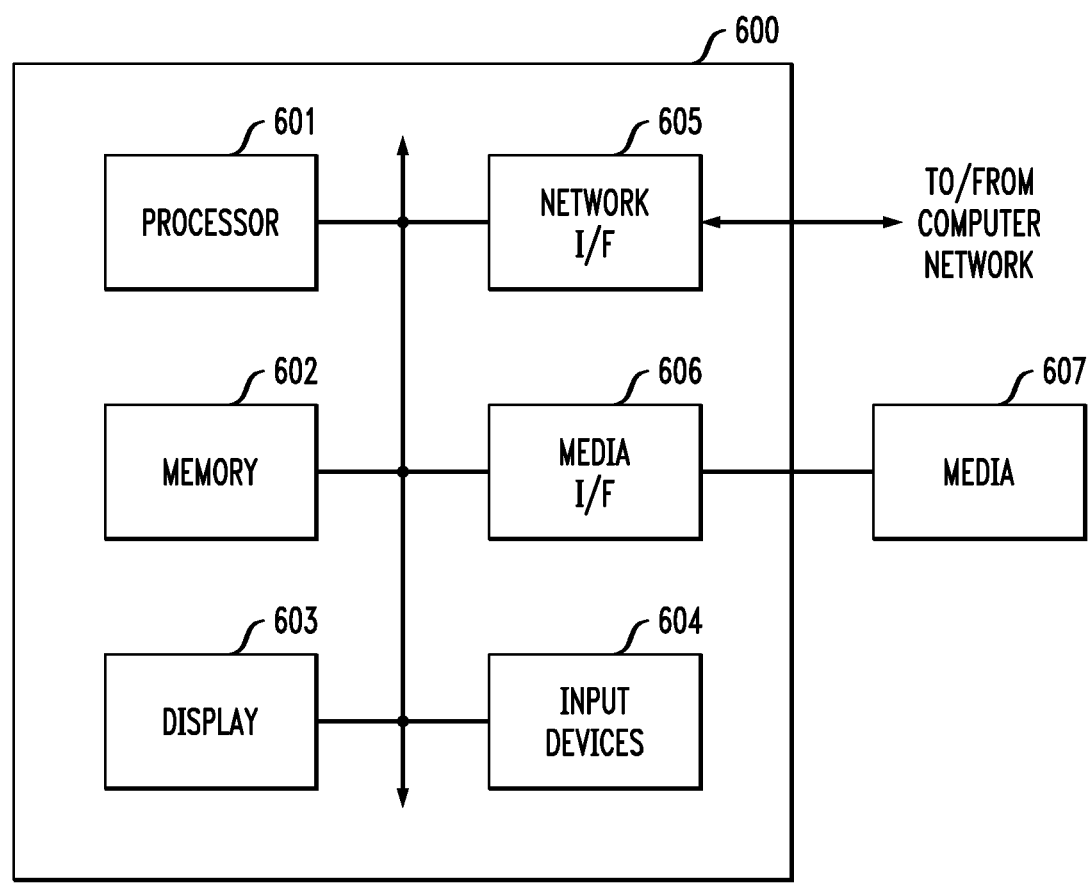
FIG. 6 is a block diagram depicting an exemplary computer system for controlling an interface according to an exemplary embodiment of the present invention.

Referring to FIG. 6; FIG. 6 is a block diagram depicting an exemplary computer system 600 configured to controlling an interface according to an embodiment of the present invention. The computer system shown in FIG. 6 includes a processor 601, memory 602, display 603, input device 604 (e.g., keyboard), a network interface (I/F) 605, a media I/F 606, and media 607, such as a signal source, e.g., camera, Hard Drive (HD), external memory device, etc.

In different applications, some of the components shown in FIG. 6 can be omitted. The whole system shown in FIG. 6 is controlled by computer readable instructions, which are generally stored in the media 607. The software can be downloaded from a network (not shown in the figures), stored in the media 607. Alternatively, software downloaded from a network can be loaded into the memory 602 and executed by the processor 601 so as to complete the function determined by the software.

The processor 601 may be configured to perform one or more methodologies described in the present disclosure, illustrative embodiments of which are shown in the above figures and described herein. Embodiments of the present invention can be implemented as a routine that is stored in memory 602 and executed by the processor 601 to process the signal from the media 607. As such, the computer system is a general-purpose computer system that becomes a specific purpose computer system when executing routines of the present disclosure.

Although the computer system described in FIG. 6 can support methods according to the present disclosure, this system is only one example of a computer system. Those skilled of the art should understand that other computer system designs can be used to implement embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   a substrate;
   an array of channels patterned as grooves in the substrate, wherein first ends of the channels are first openings on a first surface of the substrate and each channel of the array comprises a longitudinal opening on an interface surface of the substrate;
   a material disposed in each of the channels that promotes growth of neural tissue into the first openings of the channels;
   a plurality of electrodes in the substrate at second ends of the channels, wherein each channel of the array is aligned with a respective one of the electrodes; and
   a chip electrically connected to the electrodes.

2. The apparatus of claim 1, wherein the chip further comprises at least one of a wired and a wireless communication device communicating to an external computer system.

3. The apparatus of claim 1, wherein the apparatus is physically connected a prosthetic device, and the apparatus is configured to conduct signals between axons in the channels and the prosthetic device.

4. The apparatus of claim 1, wherein the chip comprises:
   a communication component; and
   a computational component.

5. The apparatus of claim 1, wherein the chip comprises a plurality of induction generators connected to the electrodes and configured to apply an electric current to axons in the channels.

6. The apparatus of claim 1, wherein the chip comprises a plurality of induction sensors connected to the electrodes configured to sense axon potentials.

7. The apparatus of claim 1, further comprising a machine learning system configured to create a model matching axon signals to a function of computer system.

8. The apparatus of claim 1, further comprising a machine learning system configured to create a model matching axon signals to a functional arrangement of a prosthetic device.

9. The apparatus of claim 1, further comprising an extended-release hydrogel on the first openings on the first surface of the substrate, wherein the longitudinal opening on an interface surface of the substrate is enclosed by a second substrate bonded to the substrate, wherein the second substrate comprises a second array of channels disposed therein.

10. The apparatus of claim 1, further comprising a plurality of micro-channel structures on sidewalls in each of the channels.

11. The apparatus of claim 1, wherein different ones of the channels have different diameters configured to differentiate types of the neural tissue.

12. An apparatus comprising:
   a substrate;
   an array of channels patterned as grooves in the substrate, wherein first ends of the channels are first openings on a first surface of the substrate and each channel of the array comprises a longitudinal opening on an interface surface of the substrate;
   a material disposed in each of the channels that promotes growth of neural tissue into the first openings of the channels;
   a plurality of electrodes in the substrate; and
   a chip electrically connected to the electrodes,
   where the plurality of electrodes comprise:
   a plurality of electrical induction sensing conductors in the substrate between the channels; and
   a plurality of electrical induction generating conductors in the substrate between the channels,
   wherein each of the electrical induction sensing conductors is disposed opposite to a respective one of the electrical induction generating conductors across a respective one of the channels.

13. The apparatus of claim 12, further comprising an extended-release hydrogel on the first openings on the first surface of the substrate, wherein the longitudinal opening on an interface surface of the substrate is enclosed by a second substrate bonded to the substrate, wherein the second substrate comprises a second array of channels disposed therein.

14. An apparatus comprising:
   a substrate comprising a plurality of stacked chips;
   an array of channels patterned as grooves in the substrate, wherein first ends of the channels are openings on a first surface of the substrate, wherein each of the channels comprises a longitudinal opening along a length of the respective channel on a surface of a respective one of the stacked chips;
   a material disposed in each of the channels that promotes growth of neural tissue into the openings of the channels;
   a plurality of electrodes in the substrate at second ends of the channels, wherein each channel is aligned with a respective one of the electrodes; and
   an integrated chip electrically connected to the electrodes, wherein a first stacked chip of the plurality of stack chips encloses the longitudinal openings of the channels of a second stack chip of the plurality of stack chips and a third stacked chip of the plurality of chips encloses the longitudinal openings of the channels of the second stack chip of the plurality of stack chips.

15. The apparatus of claim 14, wherein the integrated chip is shared by the plurality of stacked chips.

* * * * *